(12) United States Patent  
Mills

(10) Patent No.: US 7,111,908 B1  
(45) Date of Patent: Sep. 26, 2006

(54) MATERIAL/EQUIPMENT HANDLING ASSEMBLY

(76) Inventor: Frank O. Mills, 1581 Blue Ridge Dr., Marietta, GA (US) 30008

( * ) Notice: Subject to any disclaimer, the term of this patent is extended or adjusted under 35 U.S.C. 154(b) by 11 days.

(21) Appl. No.: 11/053,462

(22) Filed: Feb. 9, 2005

(51) Int. Cl.
*B60P 1/16* (2006.01)

(52) U.S. Cl. .............. 298/22 R; 298/22 J; 296/100.01; 296/50

(58) Field of Classification Search .............. 298/22 R, 298/22 J, 22 D; 296/100.01, 50, 51; 414/511, 414/521
See application file for complete search history.

(56) References Cited

U.S. PATENT DOCUMENTS

| | | | | |
|---|---|---|---|---|
| 1,815,653 | A * | 7/1931 | Jones ........................ 298/22 R |
| 2,803,847 | A * | 8/1957 | Hobbs ........................ 15/314 |
| 3,235,284 | A * | 2/1966 | Yant ........................ 280/405.1 |
| 3,512,206 | A | 5/1970 | Young |
| 3,623,764 | A * | 11/1971 | Jacobus ........................ 296/50 |
| 3,744,653 | A | 7/1973 | Jensen |
| 3,827,753 | A * | 8/1974 | Pitts ........................... 298/1 B |
| 4,062,085 | A | 12/1977 | Duncan |
| 4,218,226 | A | 8/1980 | Boozer |
| 4,227,893 | A | 10/1980 | Shaddock |
| 4,723,817 | A * | 2/1988 | Wallan ................. 298/23 MD |
| 4,927,316 | A * | 5/1990 | Kordel ........................ 414/510 |
| 4,951,999 | A * | 8/1990 | Rudolph et al. .............. 298/11 |
| 5,218,737 | A | 6/1993 | Dansby et al. |
| 5,226,757 | A | 7/1993 | Tarrant |
| 5,317,783 | A | 6/1994 | Williamson |
| 5,352,008 | A * | 10/1994 | Denvir ........................ 296/50 |
| 5,456,521 | A * | 10/1995 | Moyna ........................ 298/1 B |
| 5,513,901 | A * | 5/1996 | Smith et al. ............... 298/22 J |
| D378,294 | S | 3/1997 | Barnes et al. |
| 5,685,594 | A * | 11/1997 | Harper ........................ 296/51 |
| 5,829,818 | A * | 11/1998 | O'Daniel ..................... 296/98 |
| 6,250,709 | B1 * | 6/2001 | Haddad, Jr. .................. 296/98 |
| 6,308,375 | B1 | 10/2001 | Whitney |
| 6,588,053 | B1 | 7/2003 | Nowak |
| 6,779,825 | B1 * | 8/2004 | Greenert et al. ............. 296/51 |
| 6,817,676 | B1 * | 11/2004 | Anemone et al. ............ 298/18 |
| 6,824,189 | B1 * | 11/2004 | Crabb ................... 296/100.01 |
| 6,837,668 | B1 * | 1/2005 | Brown ........................ 414/521 |

* cited by examiner

*Primary Examiner*—Joe Dillon, Jr.
(74) *Attorney, Agent, or Firm*—Ashkan Najafi, P.A.

(57) ABSTRACT

A trailer assembly includes a body having a plurality of sidewalls for defining a cavity therebetween. Selected sidewalls are pivotally coupled to the body and selectively adaptable between loading and unloading positions and another sidewall defines a substantially planar bottom surface of the body. The body further includes a hitch section protruding forwardly therefrom. The assembly includes a rigid platform including a plurality of wheels connected thereto. Mechanisms are included for pivoting the body between sloped and horizontal positions and for separating a plurality of loads stored within the cavity respectively. The separating mechanism is removably positional within the cavity and slidably adjustable along a longitudinal length of the body. A manually retractable tarpaulin is laterally registered along a width of the body and adjoins a front end portion of the body for protecting exposed material and equipment during transit.

17 Claims, 6 Drawing Sheets

MATERIAL/EQUIPMENT HANDLING ASSEMBLY

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a material/equipment handling assembly and, more particularly, to a material/equipment handling assembly for transporting materials, equipment and the like between remote locations.

2. Prior Art

In the lawn mowing and construction industries, debris often accumulates at the worksite that hinders other tasks to be performed at the worksite. These industries, furthermore, require the use of a variety of equipment to perform various tasks properly. As such, the use of one or more trailers is often employed to carry equipment and materials, and to collect debris.

The collection of leaves, grass clippings and other organic debris from lawn mowers into either fabric collector bags, or into rigid containers of metal or plastic, is well known. In order to keep the air stream and its attendant debris moving, means must be provided for venting the high-velocity air.

In vacuum cleaners and lawnmowers which employ collector bags, this is commonly done by using a bag of porous weave which permits the air to perfuse through the fabric. However, as the bag fills up, the pores become clogged with debris which substantially blocks the air flow and greatly reduces the vacuum effect, sometimes reducing it to near zero. In addition, when such fabric bags become clogged, they are subjected to high internal pressure from the blower air stream. If the blower is very powerful, the bag can rip apart at the seams.

Furthermore, there is no known example in the prior art of knowledge, that allows a trailer equipped with a vacuum device to simultaneously carry other materials and equipment therein. Thus, an individual usually has need of two or more trailers in order to transport their equipment, materials and collected debris. It would also be advantageous to have an equipment and materials trailer having adjustable compartments so that a user may selectively adjust the size of each compartment as their need requires.

Accordingly, a need remains for a material/equipment handling assembly in order to overcome the above-noted shortcomings. The present invention satisfies such a need by providing an assembly that is easy to use, versatile, adaptable, effective, and durable. Such an assembly can haul mowers, small tractors, and related equipment, while also holding other materials like mulch or gravel. The separate front and rear compartments can also be used to conveniently carry two different types of materials simultaneously without their intermixing. The vacuum/blower unit can collect large volumes of leaves, litter, grass clippings and other debris quickly and effortlessly.

BRIEF SUMMARY OF THE INVENTION

In view of the foregoing background, it is therefore an object of the present invention to provide an equipment/material handling assembly. These and other objects, features, and advantages of the invention are provided by a trailer assembly removably attachable to a vehicle for transporting materials, equipment, and the like between remote locations.

The trailer assembly includes a body that has a plurality of operably connected sidewalls for defining a cavity therebetween such that an operator can conveniently selectively access the cavity from alternate sides of the body. Selected ones of such sidewalls are pivotally coupled to the body and selectively adaptable between loading and unloading positions such that materials and equipment stored within the cavity can be removed outwardly from the body during operating conditions. Such selected sidewalls preferably include a plurality of handles attached thereto for conveniently assisting the operator to swivel the selected sidewalls between open and closed positions. Another one of the sidewalls defines a substantially planar bottom surface of the body for effectively supporting the material and equipment thereabove.

Other ones of the sidewalls may be registered along a rear end portion of the body and are preferably pivotally connected thereto. Such other sidewalls have first and second pairs of quick-release locking brackets for allowing the operator to articulate the other sidewalls along a horizontal plane and a vertical plane respectively. The other sidewalls are preferably provided with a corrugated and rough interior surface positional at a sloped angle offset from the horizontal plane for guiding material and equipment into the cavity during operating conditions. The other sidewalls may further have a plurality of flared ramp portions monolithically formed therewith that is arcuately shaped.

The body further includes a monolithically formed hitch section protruding forwardly therefrom that is securely conjoinable to the vehicle such that the assembly may conveniently be towed between remote locations. Such a hitch section preferably includes a threadably adjustable ratcheting jack operably positioned on a support surface such that the hitch section can conveniently be maintained at an elevated position while disconnected from the vehicle. A monolithically formed ball hitch is disposed adjacent to the ratcheting jack and is removably attachable to a vehicle hitch assembly.

A rigid platform includes a plurality of wheels rotatably connected thereto for supporting the body spaced above a ground surface. Such a rigid platform may further include at least one turn signal indicator electrically matable to the vehicle's power supply source, in a manner well known in the industry.

The assembly includes a mechanism for selectively pivoting the body between sloped and horizontal positions for advantageously assisting the operator to discharge the material and equipment housed within the cavity. Such a pivoting mechanism adjoins the bottom surface. The pivoting mechanism preferably includes a hydraulic cylinder provided with a drive piston selectively adaptable between extended and retracted positions. A plurality of articulating actuator arms are operably connected to the platform and the bottom surface of the body wherein the actuator arms cooperate with the hydraulic cylinder for effectively pivoting the body about a fulcrum axis traversing a rear end portion thereof. Such a hydraulic cylinder is conjoined to the platform and maintains a fixed spatial relationship therewith while the drive piston toggles one of the actuator arms about a horizontal axis during operating conditions.

A mechanism is included for separating a plurality of loads stored within the cavity such that the loads can be effectively isolated during transport. Such a separating mechanism is removably positional within the cavity and slidably adjustable along a longitudinal length of the body such that a pair of contiguous cavity portions can advantageously be selectively adapted between alternate dimensions.

The separating mechanism preferably includes a plurality of coextensive and chamfered guide rails coupled to an interior surface of the body and extends parallel to the longitudinal length thereof such that the chamfered guide rails are equidistantly spaced apart from a central axis of the body. A mobile wall is slidably registered along the chamfered guide rails for effectively parting the plurality of loads housed within the cavity. Such a mobile wall includes a pair of oppositely spaced support frames and an access door medially nested therebetween wherein the access door can be articulated between raised and lowered positions while the mobile wall is situated within the cavity. The access door includes a plurality of quick-release fasteners attached thereto for maintaining the access door at a locked position during operating conditions. A plurality of rollers are attached to the support frames for advantageously assisting the operator to glide the mobile wall along the chamfered guide rails.

A manually operable retractable tarpaulin is laterally registered along a width of the body and adjoins a front end portion of the body such that the tarpaulin can be selectively biased between extended and retracted positions along a top opening of the body. Such a tarpaulin advantageously protects exposed material and equipment during transit.

The trailer may further include a vacuum mechanism for selectively introducing and discharging particulate materials housed within the cavity. The body further has a hopper section defined within the cavity and juxtaposed adjacent to the front end portion of the body. The vacuum mechanism is in fluid communication with the hopper section wherein the particulate materials can advantageously be effectively collected and discharged from the hopper section without occupying the cavity. Such a hopper section includes a plurality of side doors pivotally connected thereto for allowing the operator to conveniently access the hopper section from an exterior of the body.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
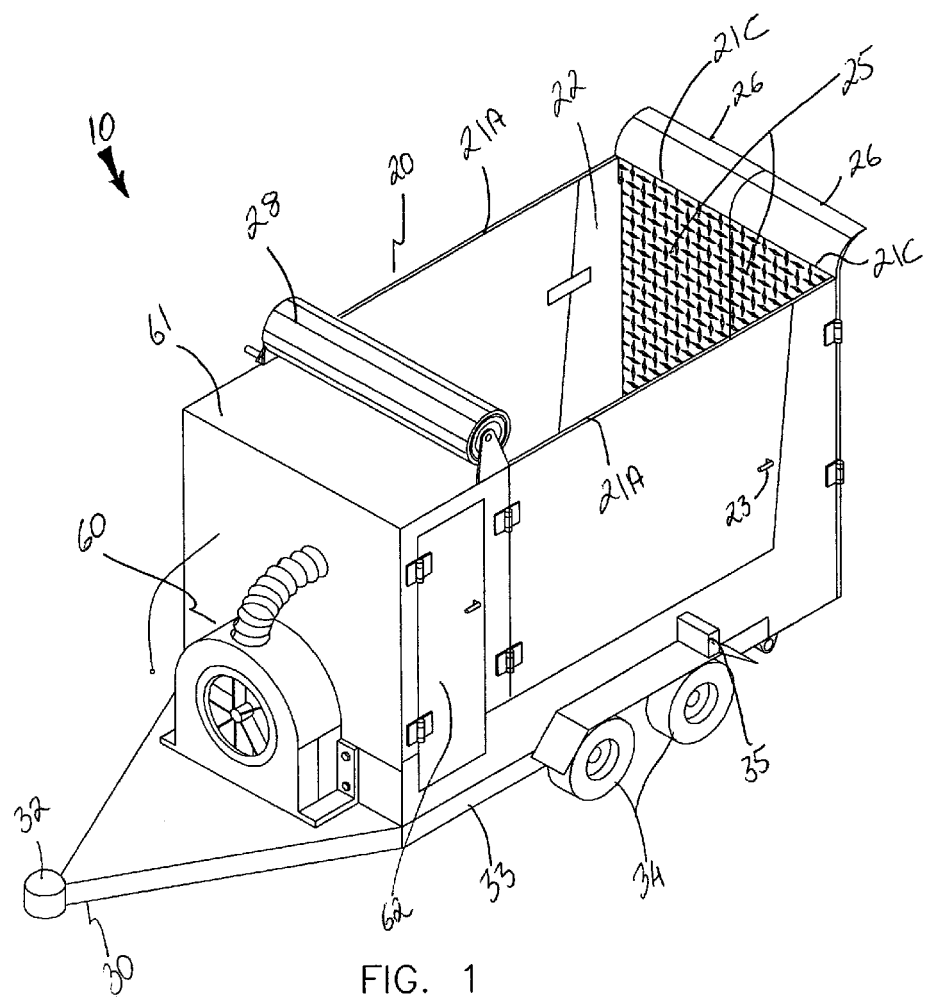
FIG. 1 is a front perspective view showing a material/equipment handling assembly, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The assembly of this invention is referred to generally in FIGS. 1–7 by the reference numeral 10 and is intended to provide a material/equipment handling assembly. It should be understood that the assembly 10 may be used to transport many different types of materials and equipment, and should not be limited in use to transporting only lawn care materials and equipment.

Referring initially to FIG. 1, the apparatus 10 includes a body 20 that has a plurality of operably connected sidewalls 21 for defining a cavity 22 therebetween such that an operator can conveniently selectively access the cavity 22 from alternate sides of the body 20. Selected ones 21A of such sidewalls 21 are pivotally coupled to the body 20 and selectively adaptable between loading and unloading positions such that materials and equipment stored within the cavity 22 can be removed outwardly from the body 20 during operating conditions. Such selected sidewalls 21A include a plurality of handles 23 attached thereto for conveniently assisting the operator to swivel the selected sidewalls 21A between open and closed positions. Another one 21B of the sidewalls 21 defines a substantially planar bottom surface of the body 20 for effectively supporting the material and equipment thereabove.

Figure 2:
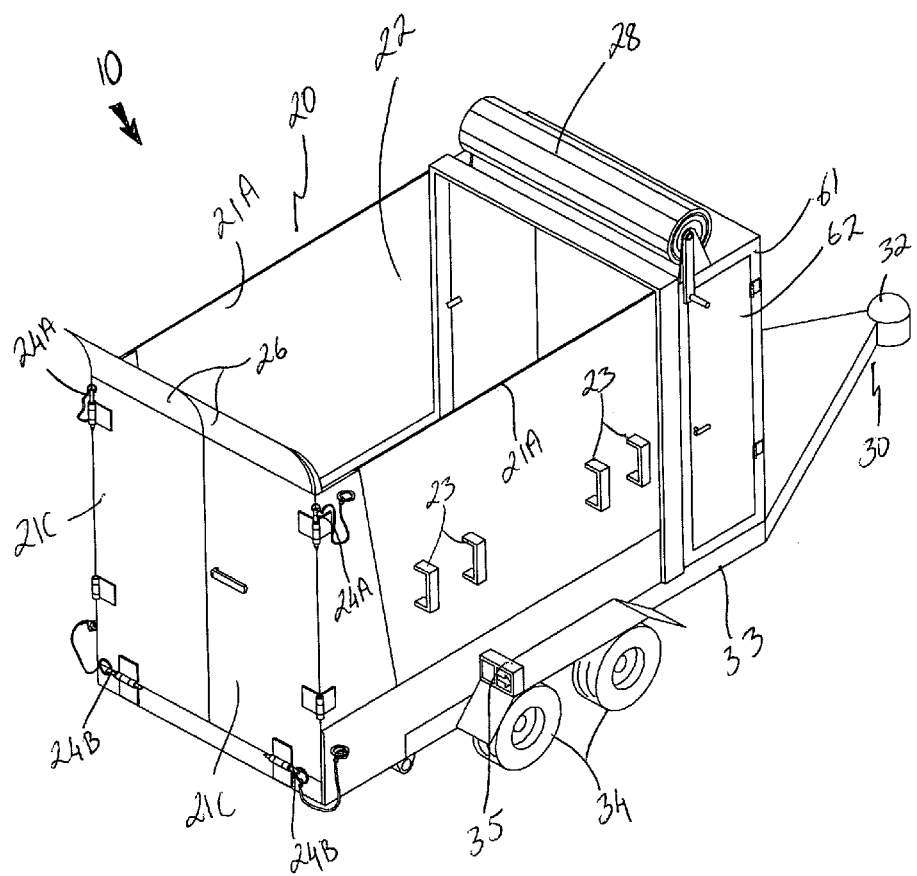
FIG. 2 is a rear perspective view of the assembly shown in FIG. 1.
Figure 3:
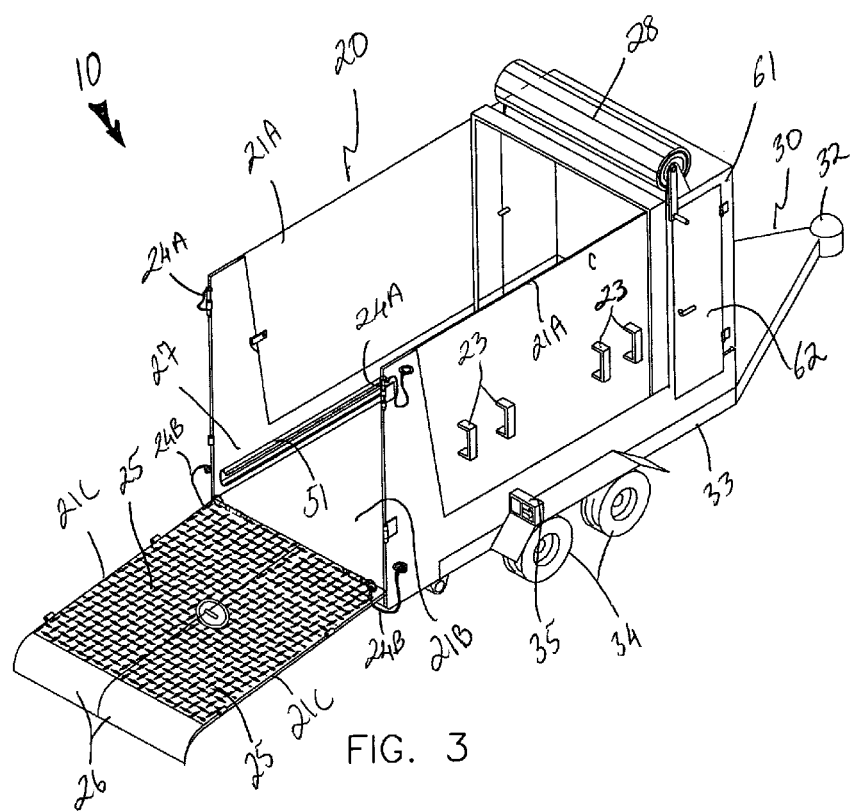
FIG. 3 is a rear perspective view of the assembly shown in FIG. 2, showing the other sidewalls articulated about their horizontal planes.
Figure 4:
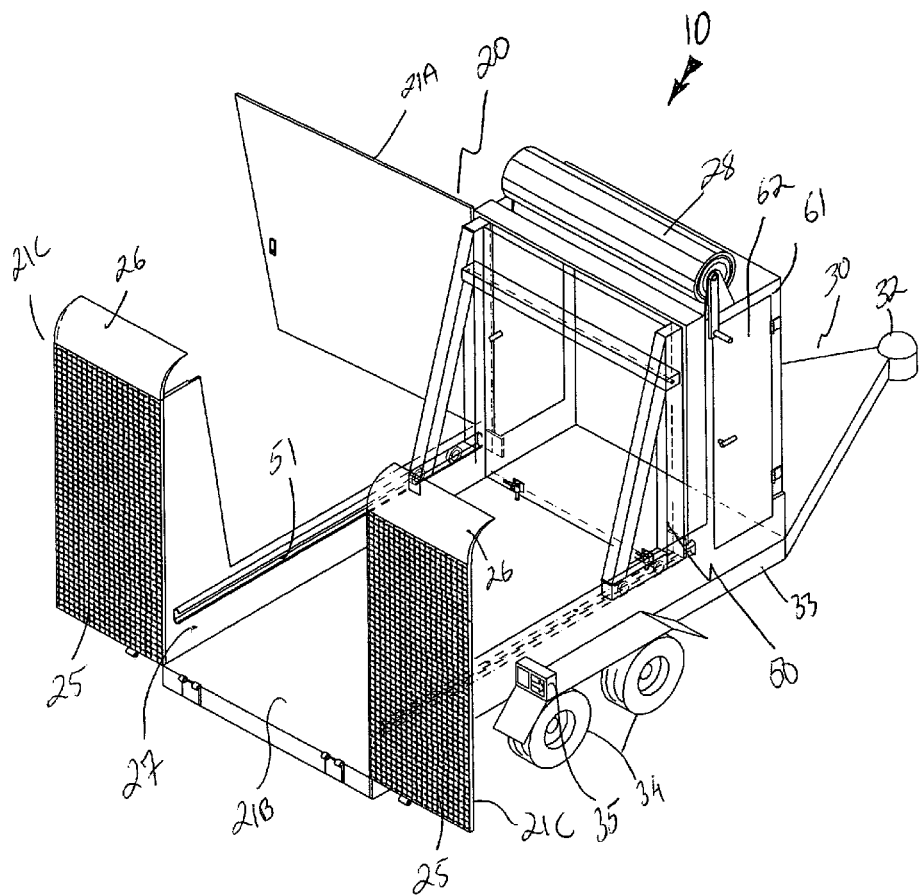
FIG. 4 is a rear perspective view of the assembly shown in FIG. 2, showing the other sidewalls articulated about their vertical planes.

Referring to FIGS. 2 through 4, other ones 21C of the sidewalls 21 are registered along a rear end portion of the body 20 and are pivotally connected thereto. Such other sidewalls 21C have first 24A and second 24B pairs of quick-release locking brackets for allowing the operator to articulate the other sidewalls 21C along a horizontal plane and a vertical plane respectively. The other sidewalls 21C are provided with a corrugated and rough interior surface 25 positional at a sloped angle offset from the horizontal plane for guiding material and equipment into the cavity 22 during operating conditions. The other sidewalls 21C further have a plurality of flared ramp portions 26 monolithically formed therewith that are arcuately shaped. Such flared ramp portions 26 advantageously assist equipment such as tractors and mowers to more easily engage the other sidewalls 21C, and thus more easily enter the cavity 22.

Referring to FIGS. 1 through 5, the body 20 further includes a monolithically formed hitch section 30 protruding forwardly therefrom that is securely conjoinable to the vehicle such that the assembly 10 may conveniently be towed between remote locations. Such a hitch section 30 includes a threadably adjustable ratcheting jack 31 operably positioned on a support surface such that the hitch section 30 can conveniently be maintained at an elevated position while disconnected from the vehicle. A monolithically formed ball hitch 32 is disposed adjacent to the ratcheting jack 31 and is removably attachable to a vehicle hitch assembly (not shown).

Still referring to FIGS. 1 through 5, a rigid platform 33 includes a plurality of wheels 34 rotatably connected thereto for supporting the body 20 spaced above a ground surface and allows for easy and convenient transport thereof in cooperation with the hitch section 30 and a vehicle. Such a rigid platform 33 further includes at least one turn signal indicator 35 electrically matable to the vehicle's power supply source, in a manner well known in the industry. The turn signal indicator 35 advantageously allows a user to indicate their intended direction of travel while towing the assembly 10, since the assembly 10 obscures the vehicle's turning signals.

Figure 5:
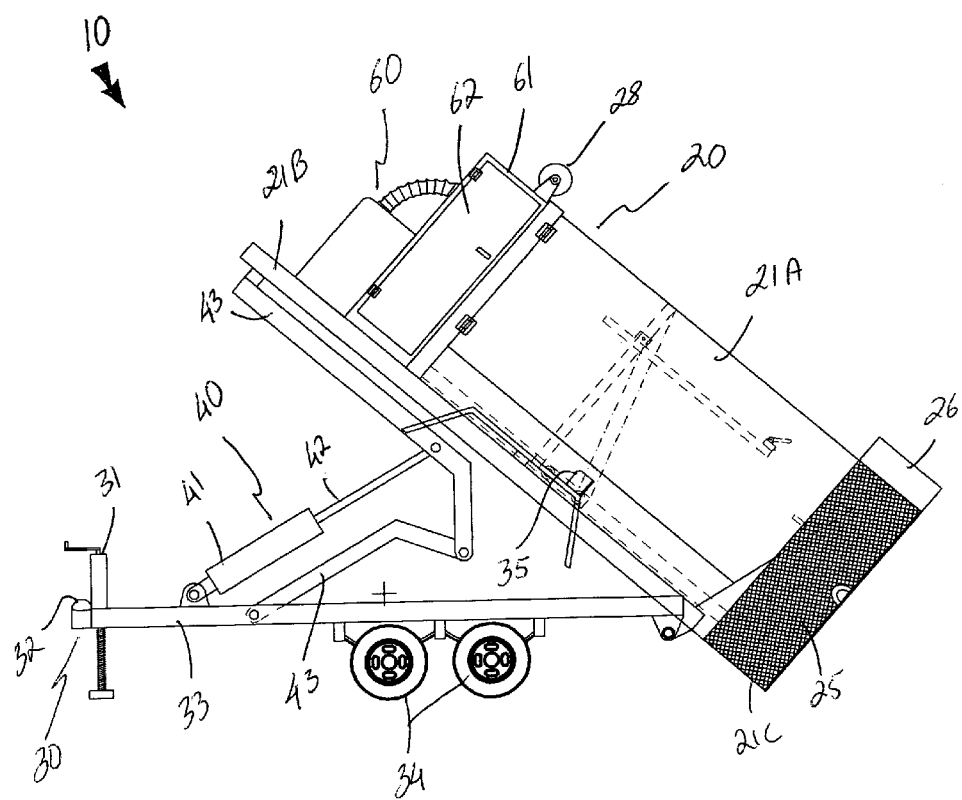
FIG. 5 is a side elevational view of the assembly shown in FIG. 1, showing the pivoting mechanism during operating conditions.

Referring to FIG. 5, the assembly 10 further includes a mechanism 40 for selectively pivoting the body 20 between sloped and horizontal positions for advantageously assisting the operator to discharge the material and equipment housed within the cavity 22. Such a pivoting mechanism 40 adjoins the bottom surface 21B. The pivoting mechanism 40 includes a hydraulic cylinder 41 provided with a drive piston 42 selectively adaptable between extended and retracted positions. A plurality of articulating actuator arms 42 are operably connected to the platform 33 and the bottom surface 21B of the body 20 wherein the actuator arms 43 cooperate with the hydraulic cylinder 41 for effectively pivoting the body 20 about a fulcrum axis traversing a rear end portion thereof. Such a hydraulic cylinder 41 is conjoined to the platform 33 and maintains a fixed spatial relationship therewith while the drive piston 42 toggles one of the actuator arms 43 about a horizontal axis during operating conditions.

Figure 6:
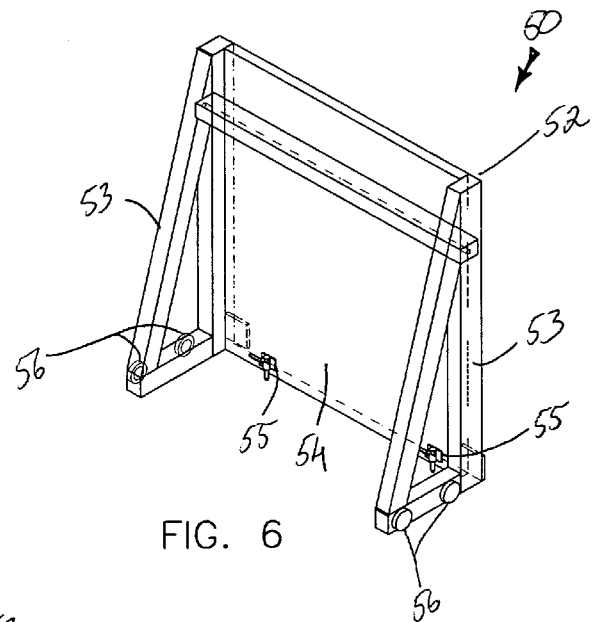
FIG. 6 is a perspective view showing the mobile wall of the separating mechanism shown in FIG. 4.
Figure 7:
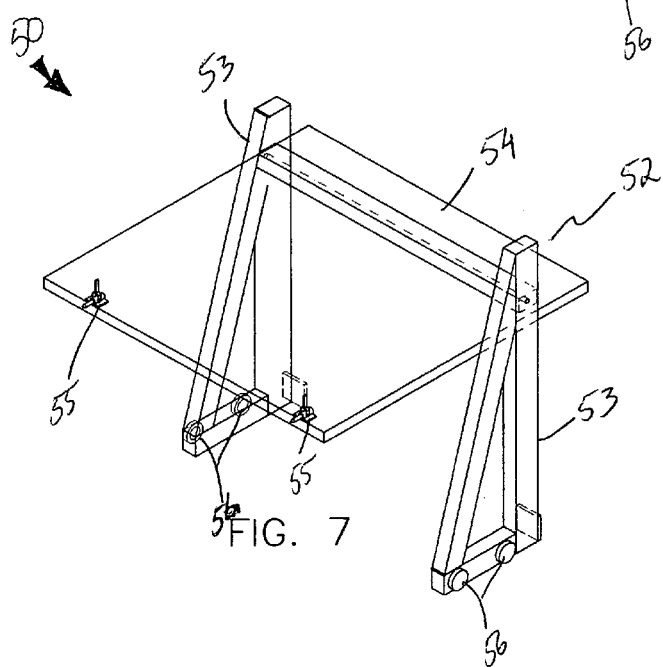
FIG. 7 is a perspective view of the separating mechanism shown in FIG. 6, showing the access door of the mobile wall articulated to a raised position.

Referring to FIGS. 4, 6 and 7, a mechanism 50 is included for separating a plurality of loads stored within the cavity 22 such that the loads can be effectively isolated during transport. Such a separating mechanism 50 is removably positional within the cavity 22 and slidably adjustable along a longitudinal length of the body 20 such that a pair of contiguous cavity portions can advantageously be selectively adapted between alternate dimensions.

Still referring to FIGS. 4, 6 and 7, the separating mechanism 50 includes a plurality of coextensive and chamfered guide rails 51 coupled to an interior surface 27 of the body 20 and extending parallel to the longitudinal length thereof such that the chamfered guide rails 51 are equidistantly spaced apart from a central axis of the body 20. A mobile wall 52 is slidably registered along the chamfered guide rails 51 for effectively parting the plurality of loads housed within the cavity 22. Such a mobile wall 52 includes a pair of oppositely spaced support frames 53 and an access door 54 medially nested therebetween wherein the access door 54 can be articulated between raised and lowered positions while the mobile wall 52 is situated within the cavity 22. The access door 54 includes a plurality of quick-release fasteners 55 attached thereto for maintaining the access door 54 at a locked position during operating conditions. A plurality of rollers 56 are attached to the support frames 53 for advantageously assisting the operator to glide the mobile wall 52 along the chamfered guide rails 51.

Referring to FIGS. 1 through 5, a manually operable retractable tarpaulin 28 is laterally registered along a width of the body 20 and adjoins a front end portion of the body 20 such that the tarpaulin 28 can be selectively biased between extended and retracted positions along a top opening of the body 20. Such a tarpaulin 28 advantageously protects exposed material and equipment during transit and further prevents materials such as mulch and leaves from scattering out of the cavity 22 during transit.

Still referring to FIGS. 1 through 5, the trailer 10 further includes a vacuum mechanism 60 for selectively introducing and discharging particulate materials housed within the cavity 22. The body 20 further has a hopper section 61 defined within the cavity 22 and juxtaposed adjacent to the front end portion of the body 20. The vacuum mechanism 60 is in fluid communication with the hopper section 61 wherein the particulate materials can advantageously be effectively collected and discharged from the hopper section 61 without occupying the cavity 22, thus improving the versatility of the assembly 10. Such a hopper section 61 includes a plurality of side doors 62 pivotally connected thereto for allowing the operator to conveniently access the hopper section 61 from an exterior of the body 20.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A trailer assembly removably attachable to a vehicle for transporting materials or equipment between remote locations, said trailer assembly comprising:

a body having a plurality of operably connected sidewalls defining a cavity therebetween such that an operator can selectively access the cavity from alternate sides of said body, selected ones of said sidewalls being pivotally coupled to said body and selectively adaptable between loading and unloading positions such that materials and equipment stored within the cavity can be removed outwardly from said body during operating conditions, said body further including a monolithically formed hitch section protruding forwardly therefrom and being securely conjoinable to the vehicle such that said assembly may be towed between remote locations, another one of said sidewalls defining a substantially planar bottom surface of said body for supporting the material and equipment thereabove;

a rigid platform and a plurality of wheels rotatably connected thereto for supporting said body spaced above a ground surface;

means for selectively pivoting said body between sloped and horizontal positions for assisting the operator to discharge the material and equipment housed within the cavity;

means for separating a plurality of loads stored within the cavity such that the loads can be effectively isolated during transport, said separating means being removably positional within the cavity and slidably adjustable along a longitudinal length of said body such that a pair of contiguous cavity portions can be selectively adapted between alternate dimensions; and a retractable tarpaulin laterally registered along a width of said body and adjoining a front end portion of said body such that said tarpaulin can be selectively biased between extended and retracted positions along a top opening of said body, said tarpaulin for protecting exposed material and equipment during transit.

2. The trailer assembly of claim 1, wherein said pivoting means comprises:

a hydraulic cylinder provided with a drive piston selectively adaptable between extended and retracted positions; and a plurality of articulating actuator arms operably connected to said platform and said bottom surface of said body wherein said actuator arms cooperate with said hydraulic cylinder for pivoting said body about a fulcrum axis traversing a rear end portion thereof, said hydraulic cylinder being conjoined to said platform and maintaining a fixed spatial relationship therewith while said drive piston toggles one said actuator arms about a horizontal axis during operating conditions.

3. The trailer assembly of claim 1, wherein said hitch section comprises:

a threadably adjustable ratcheting jack operably positioned on a support surface such that said hitch section can be maintained at an elevated position while disconnected from the vehicle; and a monolithically formed ball hitch disposed adjacent said ratcheting jack and being removably attachable to a vehicle hitch assembly.

4. The trailer assembly of claim 1, wherein said separating means comprises:

a plurality of coextensive and chamfered guide rails coupled to an interior surface of said body and extending parallel to the longitudinal length thereof such that said chamfered guide rails are equidistantly spaced apart from a central axis of said body;

a mobile wall slidably registered along said chamfered guide rails for parting the plurality of loads housed within the cavity, said mobile wall including a pair of oppositely spaced support frames and an access door medially nested therebetween wherein said access door can be articulated between raised and lowered positions while said mobile wall is situated within the cavity, said access door including a plurality of quick-release fasteners attached thereto for maintaining said access door at a locked position during operating conditions; and a plurality of rollers attached to said support frames for assisting the operator to glide said mobile wall along the chamfered guide rails.

5. The trailer assembly of claim 1, wherein said selected sidewalls include a plurality of handles attached thereto for assisting the operator to swivel said selected sidewalls between open and closed positions.

6. The trailer assembly of claim 1, wherein other ones of said sidewalls are registered along a rear end portion of said body and are pivotally connected thereto, said other sidewalls having first and second pairs of quick-release locking brackets for allowing the operator to articulate said other sidewalls along a horizontal plane and a vertical plane respectively, said other sidewalls being provided with a corrugated and rough interior surface positional at a sloped angle offset from the horizontal plane for guiding material and equipment into the cavity during operating conditions, said other sidewalls further having a plurality of flared ramp portions monolithically formed therewith and being arcuately shaped.

7. A trailer assembly removably attachable to a vehicle for transporting materials or equipment between remote locations, said trailer assembly comprising:

a body having a plurality of operably connected sidewalls defining a cavity therebetween such that an operator can selectively access the cavity from alternate sides of said body, selected ones of said sidewalls being pivotally coupled to said body and selectively adaptable between loading and unloading positions such that materials and equipment stored within the cavity can be removed outwardly from said body during operating conditions, said body further including a monolithically formed hitch section protruding forwardly therefrom and being securely conjoinable to the vehicle such that said assembly may be towed between remote locations, another one of said sidewalls defining a substantially planar bottom surface of said body for supporting the material and equipment thereabove;

a rigid platform and a plurality of wheels rotatably connected thereto for supporting said body spaced above a ground surface;

means for selectively pivoting said body between sloped and horizontal positions for assisting the operator to discharge the material and equipment housed within the cavity;

means for separating a plurality of loads stored within the cavity such that the loads can be effectively isolated during transport, said separating means being removably positional within the cavity and slidably adjustable along a longitudinal length of said body such that a pair of contiguous cavity portions can be selectively adapted between alternate dimensions; and a manually operable retractable tarpaulin laterally registered along a width of said body and adjoining a front end portion of said body such that said tarpaulin can be selectively biased between extended and retracted positions along a top opening of said body, said tarpaulin for protecting exposed material and equipment during transit.

8. The trailer assembly of claim 7, wherein said pivoting means comprises:

a hydraulic cylinder provided with a drive piston selectively adaptable between extended and retracted positions; and a plurality of articulating actuator arms operably connected to said platform and said bottom surface of said body wherein said actuator arms cooperate with said hydraulic cylinder for pivoting said body about a fulcrum axis traversing a rear end portion thereof, said hydraulic cylinder being conjoined to said platform and maintaining a fixed spatial relationship therewith while said drive piston toggles one said actuator arms about a horizontal axis during operating conditions.

9. The trailer assembly of claim 7, wherein said hitch section comprises:
- a threadably adjustable ratcheting jack operably positioned on a support surface such that said hitch section can be maintained at an elevated position while disconnected from the vehicle; and
- a monolithically formed ball hitch disposed adjacent said ratcheting jack and being removably attachable to a vehicle hitch assembly.

10. The trailer assembly of claim 7, wherein said separating means comprises:
- a plurality of coextensive and chamfered guide rails coupled to an interior surface of said body and extending parallel to the longitudinal length thereof such that said chamfered guide rails are equidistantly spaced apart from a central axis of said body;
- a mobile wall slidably registered along said chamfered guide rails for parting the plurality of loads housed within the cavity, said mobile wall including a pair of oppositely spaced support frames and an access door medially nested therebetween wherein said access door can be articulated between raised and lowered positions while said mobile wall is situated within the cavity, said access door including a plurality of quick-release fasteners attached thereto for maintaining said access door at a locked position during operating conditions; and
- a plurality of rollers attached to said support frames for assisting the operator to glide said mobile wall along the chamfered guide rails.

11. The trailer assembly of claim 7, wherein said selected sidewalls include a plurality of handles attached thereto for assisting the operator to swivel said selected sidewalls between open and closed positions.

12. The trailer assembly of claim 7, wherein other ones of said sidewalls are registered along a rear end portion of said body and are pivotally connected thereto, said other sidewalls having first and second pairs of quick-release locking brackets for allowing the operator to articulate said other sidewalls along a horizontal plane and a vertical plane respectively, said other sidewalls being provided with a corrugated and rough interior surface positional at a sloped angle offset from the horizontal plane for guiding material and equipment into the cavity during operating conditions, said other sidewalls further having a plurality of flared ramp portions monolithically formed therewith and being arcuately shaped.

13. A trailer assembly removably attachable to a vehicle for transporting materials or equipment between remote locations, said trailer assembly comprising:
- a body having a plurality of operably connected sidewalls defining a cavity therebetween such that an operator can selectively access the cavity from alternate sides of said body, selected ones of said sidewalls being pivotally coupled to said body and selectively adaptable between loading and unloading positions such that materials and equipment stored within the cavity can be removed outwardly from said body during operating conditions, said body further including a monolithically formed hitch section protruding forwardly therefrom and being securely conjoinable to the vehicle such that said assembly may be towed between remote locations, another one of said sidewalls defining a substantially planar bottom surface of said body for supporting the material and equipment thereabove;
- a rigid platform and a plurality of wheels rotatably connected thereto for supporting said body spaced above a ground surface;
- means for selectively pivoting said body between sloped and horizontal positions for assisting the operator to discharge the material and equipment housed within the cavity, said pivoting means adjoining said bottom surface;
- means for separating a plurality of loads stored within the cavity such that the loads can be effectively isolated during transport, said separating means being removably positional within the cavity and slidably adjustable along a longitudinal length of said body such that a pair of contiguous cavity portions can be selectively adapted between alternate dimensions; and
- a manually operable retractable tarpaulin laterally registered along a width of said body and adjoining a front end portion of said body such that said tarpaulin can be selectively biased between extended and retracted positions along a top opening of said body, said tarpaulin for protecting exposed material and equipment during transit.

14. The trailer assembly of claim 13, wherein said pivoting means comprises:
- a hydraulic cylinder provided with a drive piston selectively adaptable between extended and retracted positions; and
- a plurality of articulating actuator arms operably connected to said platform and said bottom surface of said body wherein said actuator arms cooperate with said hydraulic cylinder for pivoting said body about a fulcrum axis traversing a rear end portion thereof, said hydraulic cylinder being conjoined to said platform and maintaining a fixed spatial relationship therewith while said drive piston toggles one said actuator arms about a horizontal axis during operating conditions.

15. The trailer assembly of claim 13, wherein said hitch section comprises:
- a threadably adjustable ratcheting jack operably positioned on a support surface such that said hitch section can be maintained at an elevated position while disconnected from the vehicle; and
- a monolithically formed ball hitch disposed adjacent said ratcheting jack and being removably attachable to a vehicle hitch assembly.

16. The trailer assembly of claim 13, wherein said separating means comprises:
- a plurality of coextensive and chamfered guide rails coupled to an interior surface of said body and extending parallel to the longitudinal length thereof such that said chamfered guide rails are equidistantly spaced apart from a central axis of said body;
- a mobile wall slidably registered along said chamfered guide rails for parting the plurality of loads housed within the cavity, said mobile wall including a pair of oppositely spaced support frames and an access door medially nested therebetween wherein said access door can be articulated between raised and lowered positions while said mobile wall is situated within the cavity, said access door including a plurality of quick-release fasteners attached thereto for maintaining said access door at a locked position during operating conditions; and
- a plurality of rollers attached to said support frames for assisting the operator to glide said mobile wall along the chamfered guide rails.

17. The trailer assembly of claim 13, wherein said selected sidewalls include a plurality of handles attached thereto for assisting the operator to swivel said selected sidewalls between open and closed positions;

other ones of said sidewalls are registered along a rear end portion of said body and are pivotally connected thereto, said other sidewalls having first and second pairs of quick-release locking brackets for allowing the operator to articulate said other sidewalls along a horizontal plane and a vertical plane respectively, said other sidewalls being provided with a corrugated and rough interior surface positional at a sloped angle offset from the horizontal plane for guiding material and equipment into the cavity during operating conditions, said other sidewalls further having a plurality of flared ramp portions monolithically formed therewith and being arcuately shaped.

* * * * *